US011666911B2

(12) United States Patent
Zheng et al.

(10) Patent No.: US 11,666,911 B2
(45) Date of Patent: Jun. 6, 2023

(54) SAMPLE EXTRACTION CHIP AND BIOLOGICAL REACTION DEVICE

(71) Applicant: Capitalbio Corporation, Beijing (CN)

(72) Inventors: Longtang Zheng, Beijing (CN); Lei Wang, Beijing (CN); Liang Bai, Beijing (CN); Xinying Zhou, Beijing (CN); Fei Wen, Beijing (CN); Yanan Wang, Beijing (CN); Xiang Chen, Beijing (CN); Tengfei Guo, Beijing (CN); Baolian Li, Beijing (CN); Li Ma, Beijing (CN); Jing Cheng, Beijing (CN)

(73) Assignee: Capitalbio Corporation, Beijing (CN)

( * ) Notice: Subject to any disclaimer, the term of this patent is extended or adjusted under 35 U.S.C. 154(b) by 380 days.

(21) Appl. No.: 17/121,337

(22) Filed: Dec. 14, 2020

(65) Prior Publication Data

US 2021/0322982 A1    Oct. 21, 2021

(30) Foreign Application Priority Data

Apr. 18, 2020   (CN) .......................... 202010308397.6

(51) Int. Cl.
*B01L 3/00* (2006.01)

(52) U.S. Cl.
CPC . *B01L 3/502738* (2013.01); *B01L 2300/0803* (2013.01)

(58) Field of Classification Search
CPC ............. B01L 3/5027; B01L 3/502715; B01L 3/502753; B01L 3/502738; B01L 3/523;
(Continued)

(56) References Cited

U.S. PATENT DOCUMENTS

2005/0272169 A1   12/2005 Griffin et al.
2006/0144802 A1   7/2006 Kitawaki et al.
(Continued)

FOREIGN PATENT DOCUMENTS

CN    103203258 A    7/2013
CN    105316224 B   10/2017
(Continued)

OTHER PUBLICATIONS

Fu, Yu, et al., "Integrated paper-based detection chip with nucleic acid extraction and amplification for automatic and sensitive pathogen detection," Sensors and Actuators B 261 (2018) 288-296.
(Continued)

*Primary Examiner* — Jennifer Wecker
*Assistant Examiner* — Alea N. Martin
(74) *Attorney, Agent, or Firm* — Knobbe, Martens, Olson & Bear, LLP

(57) ABSTRACT

A sample extraction chip and a biological reaction device are disclosed according to the present disclosure. The sample extraction chip includes a chip body and a sample extraction module provided on the chip body, the sample extraction module includes a sample-loading lysis unit, a liquid release-control unit, an extraction unit, a liquid switch-control unit, a liquid collection unit and a sample collection unit, which are connected through flow channels in a sequence of extraction. The liquid release-control unit is configured to store and release liquid reagents, and the liquid switch-control unit is configured to switch between communication of the liquid collection unit and the extraction unit and communication of the sample collection unit and the extraction unit. The sample collection unit includes a front collection portion and a rear collection portion which are both in communication with the liquid switch-control unit.

23 Claims, 9 Drawing Sheets

(58) Field of Classification Search
CPC ....... B01L 2300/0803; B01L 2300/044; B01L 2300/0672; B01L 2300/0681; B01L 2300/0864; B01L 2300/0867; B01L 2200/027; B01L 2200/04; B01L 2200/0605; B01L 2200/0621; B01L 2400/0406; B01L 2400/0409; B01L 2400/0412; B01L 2400/0633; B01L 2400/0677; B01L 2400/0683; G01N 35/00069; G01N 2035/00237; G01N 2035/00346

See application file for complete search history.

(56) References Cited

U.S. PATENT DOCUMENTS

| | | |
|---|---|---|
| 2008/0274015 A1 | 11/2008 | Park et al. |
| 2011/0094600 A1 | 4/2011 | Bergeron et al. |
| 2013/0303355 A1 | 11/2013 | Daub et al. |
| 2014/0242721 A1 | 8/2014 | Kellogg et al. |
| 2015/0314289 A1 | 11/2015 | Kellogg |
| 2016/0090588 A1 | 3/2016 | Lofquist et al. |
| 2016/0263577 A1 | 9/2016 | Ismagilov et al. |
| 2018/0272344 A1 | 9/2018 | Brettschneider et al. |
| 2020/0008299 A1* | 1/2020 | Tran .................. H05K 1/0386 |

FOREIGN PATENT DOCUMENTS

| | | |
|---|---|---|
| CN | 107557285 A | 1/2018 |
| CN | 107893026 A | 4/2018 |
| CN | 109456882 A | 3/2019 |
| CN | 110029052 A | 7/2019 |
| CN | 110441108 A | 11/2019 |
| CN | 209923319 U | 1/2020 |
| DE | 102015218665 A1 | 3/2017 |

OTHER PUBLICATIONS

Zhao, Shu-Mi, et al., "An Integrated Nucleic Acid Extraction Microchip for Real-time PCR Micro Total Analysis," Chinese Journal of Analytical Chemistry, vol. 42, Issue 10, Oct. 2014, 1393-1399.

Extended European Search Report in European Patent Application No. 20214852.4 dated Sep. 27, 2021.

Partial European Search Report in European Patent Application No. EP20214852.4 dated May 31, 2021.

* cited by examiner

SAMPLE EXTRACTION CHIP AND BIOLOGICAL REACTION DEVICE

The present disclosure claims the priority to Chinese patent application No. 202010308397.6 titled "SAMPLE EXTRACTION CHIP AND BIOLOGICAL REACTION DEVICE", filed with the China National Intellectual Property Administration on Apr. 18, 2020, which is incorporated herein by reference in its entirety.

FIELD

The present disclosure relates to the technical field of sample extraction, and in particular to a sample extraction chip and a biological reaction device

BACKGROUND

Microfluidic chip technology is a technology of integrating basic operation units such as sample preparation, reaction, separation, and detection in biological, chemical or medical analysis processes onto a micron-scale chip to automatically complete the entire analysis process. Specifically, the microfluidic chip can be used for sample extraction, such as nucleic acid extraction.

Currently, the sample extraction chip has at least two sample extraction modules, and each sample extraction module has a sample collection pool. In the sample extraction module, the extracted samples are all located in a sample collection pool. Affected by various factors, there are impurities in the samples of the sample collection pool, resulting in low purity of the extracted samples, affecting subsequent operations on the samples, and ultimately affecting the test results.

In summary, a technical issue to be addressed that those skilled in the art desire to achieve is to provide a sample extraction chip to improve the purity of the extracted samples.

SUMMARY

An object of the present disclosure is to provide a sample extraction chip to improve the purity of the extracted samples. Another object of the present disclosure is to provide a biological reaction device with the above sample extraction chip.

In order to achieve the above objects, the following technical solutions are provided according to the present disclosure.

A sample extraction chip is provided, which includes a chip body and a sample extraction module provided on the chip body;
where the sample extraction module includes a sample-loading lysis unit, a liquid release-control unit, an extraction unit, a liquid switch-control unit, a liquid collection unit and a sample collection unit connected through flow channels in a sequence of extraction;
the liquid release-control unit is configured to store and release liquid reagents, and the liquid switch-control unit is configured to switch between communication of the liquid collection unit and the extraction unit as well as communication of the sample collection unit and the extraction unit; and
the sample collection unit includes a front collection portion and a rear collection portion which are both in communication with the liquid switch-control unit, the front collection portion and the rear collection portion are sequentially distributed along a rotation direction of the chip body, samples flow into the front collection portion first, and then into the rear collection portion, and at least one of the rear collection portion is provided with a sampling port.

Preferably, the front collection portion and the rear collection portion are both collection portions, and the collection portions are evenly spaced along the rotation direction of the chip body.

Preferably, the front collection portion is provided with the sampling port.

Preferably, a volume of each of the front collection portion is greater than a volume of each of the rear collection portion, or the last rear collection portion of the front collection portion and the rear collection portion has a largest volume; and
a volume of the sample collection unit is the sum of the volumes of the front collection portion and the rear collection portion, and the volume of the front collection portion accounts for 20% to 30% of the volume of the sample collection unit.

Preferably, the sampling port is sealed by a sealing member, and the sealing member is a suction sac.

Preferably, the sample-loading lysis unit includes a lysis device and a sample inlet provided on the lysis device, where the sample inlet is in communication with the lysis device, and the lysis device and the chip body are two independent parts.

Preferably, the lysis device includes
a lysis shell with ports at two ends,
a sealing film that is connected with the lysis shell and configured to seal one port, and
a sealing cover that is connected with the lysis shell and configured to seal the other port,
where the sealing cover is provided with an opening in communication with the sample inlet.

Preferably, the liquid release-control unit includes
a liquid storage sac, and
a fixed-position release chamber tightly connected with the liquid storage sac,
where the liquid storage sac has a liquid storage cover that is deformable under pressure and a sealing layer that is configured to seal the liquid storage cover, the space defined by the sealing layer and the liquid storage cover is configured to contain liquid, and the connection strength of the sealing region between the sealing layer and the liquid storage cover is greater than the strength required for rupture of the sealing layer; and
the fixed-position release chamber has a guiding chamber for collecting liquid and a liquid release site, and when an external force is applied to the liquid storage cover, the liquid release site only pierces the sealing layer to cause the liquid storage sac to communicate with the guiding chamber.

Preferably, the guiding chamber is a guiding groove recessed downwardly and provided on the chip body, the guiding groove is in communication with a downstream microchannel, and the inlet of the guiding groove is completely covered by the sealing layer.

Preferably, the liquid release site extends from a wall of the guiding groove to a cavity of the guiding groove, and an end of the liquid release site corresponds to part of the sealing region of the sealing layer; and
an edge of the wall of the guiding groove where the liquid release site is not provided has a rounded structure.

Preferably, the liquid release-control unit includes
a sliding chamber provided on the chip body, a liquid storage chamber provided inside the sliding chamber, and a thorn provided on the chip body and corresponding to a sealing film, where the chip body is provided with a liquid discharge port, and the liquid discharge port is in communication with the downstream microchannel;

the liquid storage chamber tightly cooperates with the sliding chamber and is movable toward the chip body, the sealing film is provided at one end of the liquid storage chamber close to the chip body, and a storage cavity for storing liquid is defined by the sealing film and the inner wall of the liquid storage chamber; and the liquid storage chamber is forced to move to contact with the thorn, the sealing film ruptures.

Preferably, the liquid release-control unit includes a liquid storage chamber and a liquid flow-control unit located downstream from the liquid storage chamber;

where the liquid flow-control unit is located between the sample-loading lysis unit and the extraction unit.

Preferably, the liquid flow-control unit is a capillary channel, an inlet of the capillary channel is closer to a rotation center of the chip body than an outlet of the capillary channel, and a maximum distance from the capillary channel to a surface of the chip body is greater than a distance from the inner wall of the sample-loading lysis unit to the surface of the chip body.

Preferably, a passive blocking pipe section is provided between the inlet of the capillary channel and the apex of the capillary channel, the equivalent diameter of the passive blocking pipe section is greater than the equivalent diameter of the capillary channel, and the surface of the inner wall or part of the inner wall of the passive blocking pipe section is hydrophobic;

where the apex of the capillary channel is the position where the distance from the capillary channel to the surface of the chip body is the largest.

Preferably, the liquid flow-control unit includes a flow control pipeline, and a blocked pipeline connected in series with the flow control pipeline, where the equivalent diameter of the flow control pipeline is smaller than the equivalent diameter of the blocked pipeline, the blocked pipeline is pre-buried with a hot melt component, and the blocked pipeline is blocked by the hot melt component.

Preferably, the blocked pipeline is located at a position close to the outlet of the flow control pipeline, the distance from the blocked pipeline to the outlet of the flow control pipeline is not greater than a length of the blocked pipeline, and a pipeline of the flow control pipeline located between the blocked pipeline and the outlet of the flow control pipeline is consistent with a radial direction of the chip body.

Preferably, the liquid flow-control unit includes a flow control pipeline, and a flow resistance element connected in series with the flow control pipeline, where, when hydraulic pressure in the flow control pipeline is not greater than preset pressure, the flow resistance element is configured to prevent the liquid from passing through the flow control pipeline; and when the hydraulic pressure in the flow control pipeline is greater than the preset pressure, the flow resistance element allows the liquid to pass through the flow control pipeline.

Preferably, the extraction unit includes a fluid chamber, and an extraction adsorption component located in the fluid chamber, where, one fluid chamber is provided, or two fluid chambers are provided, namely an upstream fluid chamber and a downstream fluid chamber, the upstream fluid chamber and the downstream fluid chamber are connected in series, and the extraction adsorption component is filled in the downstream fluid chamber.

Preferably, whole or a rear end of the fluid chamber filled with the extraction adsorption component is tapered along the flow direction of the fluid.

Preferably, the liquid switch-control unit includes a valve seat, a valve core, an upstream fluid channel connecting pipe, two downstream fluid channel connecting pipes, and a drive component, where the valve seat includes a valve core movement channel, a first valve core stop position and a second valve core stop position both of which are in the valve core movement channel;

the upstream fluid channel connecting pipe and the downstream fluid channel connecting pipes are all in communication with the valve core movement channel; and the driving component is configured to drive the valve core to move by magnetic force, and when the valve core is at the first valve core stop position, the upstream fluid channel connecting pipe is in communication with one of the downstream fluid channel connecting pipes; when the valve core is at the second valve core stop position, the upstream fluid channel connecting pipe is in communication with the other one of the downstream fluid channel connecting pipes.

Preferably, the valve seat is an arc-shaped pipe, and the arc-shaped pipe protrudes toward the rotation center of the chip body, the upstream fluid channel connecting pipe is located in the middle of the arc-shaped pipe, and the two downstream fluid channel connecting pipes are respectively located at two ends of the arc-shaped pipe.

Preferably, the liquid switch-control unit includes a deflection cavity with a set size in the radial direction and the normal direction of the chip body and in the direction perpendicular to the chip body, where an upstream liquid inlet is provided on one side of the deflection cavity close to the rotation center of the chip body, two downstream liquid outlets are provided on one side of the deflection cavity away from the rotation center of the chip body, and the two downstream liquid outlets are respectively located at two ends of the deflection cavity.

Based on the sample extraction chip provided above, a biological reaction device is further disclosed according to the present disclosure, which includes the sample extraction chip according to any one of the above aspects.

In the sample extraction chip according to the present disclosure, the sample collection unit includes the front collection portion and the rear collection portion. Since the front collection portion and the rear collection portion are sequentially distributed along the rotation direction of the chip body and the samples flow into the front collection portion first, and then into the rear collection portion, the sample in the extraction unit enters the front collection portion and the rear collection portion sequentially from the liquid switch-control unit, the front collection portion collects the front-section sample, and the rear collection portion collects the rear-section sample. Since at least one of the rear collection portion has a sampling port, the sample can be obtained from the rear collection portion to obtain the rear-section sample. Affected by the centrifugal force, most of the impurities in the sample are in the front-section part. Therefore, most of the impurities are in the front collection portion, and there are fewer impurities in the rear collection portion. Therefore, with the sample extraction chip, segmented sample collection is realized, and the rear-section sample can be extracted, thereby effectively improving the purity of the extracted sample.

BRIEF DESCRIPTION OF THE EMBODIMENTS

For more clearly illustrating embodiments of the present disclosure or the technical solutions in the conventional technology, drawings referred to for describing the embodiments or the conventional technology will be briefly described hereinafter. Apparently, drawings in the following description are only examples of the present disclosure, and for the person skilled in the art, other drawings may be obtained based on the provided drawings without any creative efforts.

DETAILED DESCRIPTION OF THE EMBODIMENTS

The technical solutions according to the embodiments of the present disclosure will be described clearly and completely as follows in conjunction with the drawings in the embodiments of the present disclosure. It is apparent that the described embodiments are only a part of the embodiments according to the present disclosure, rather than all the embodiments. Any other embodiments obtained by those skilled in the art based on the embodiments of the present disclosure without any creative work fall within the protection scope of the present disclosure.

Figure 1:
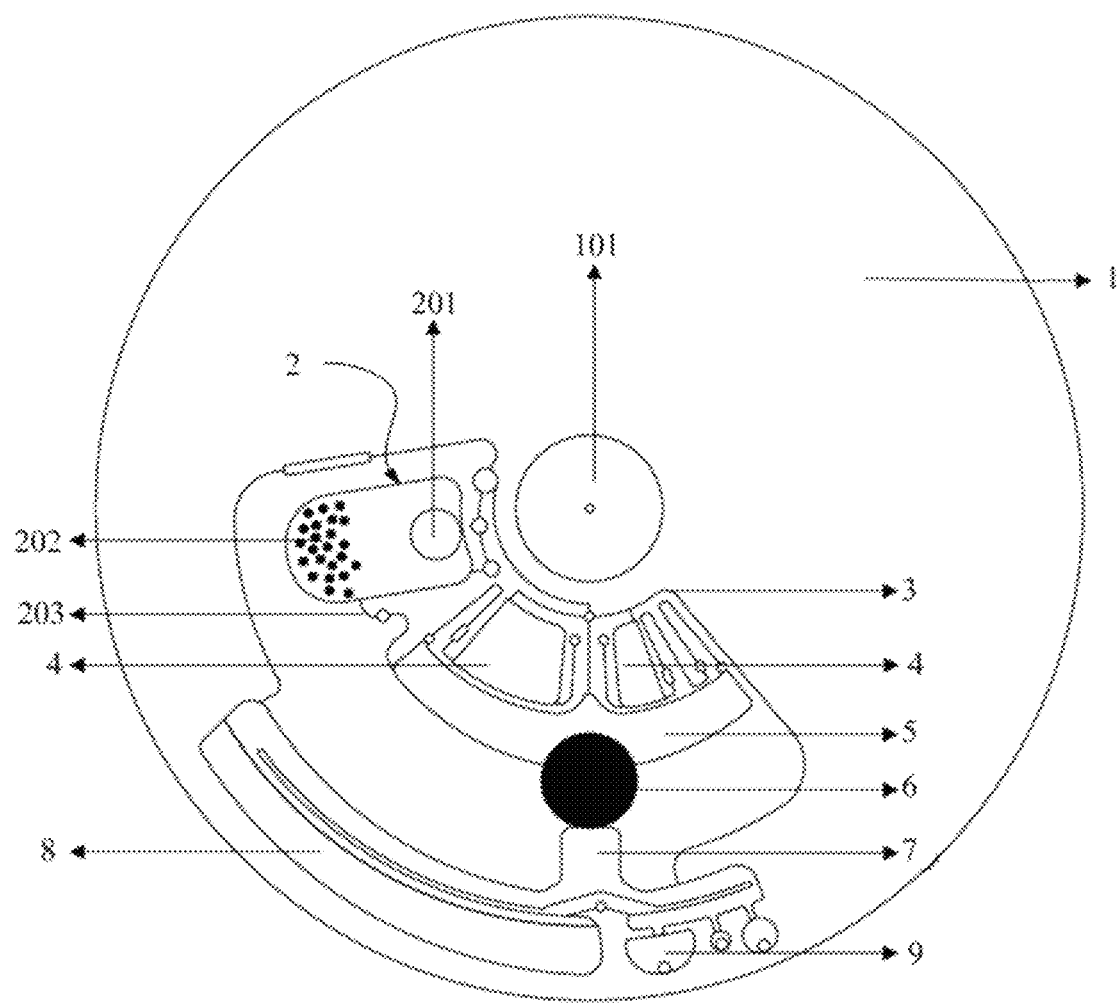
FIG. 1 is a schematic diagram of a sample extraction device according to an embodiment of the present disclosure.
Figure 2:
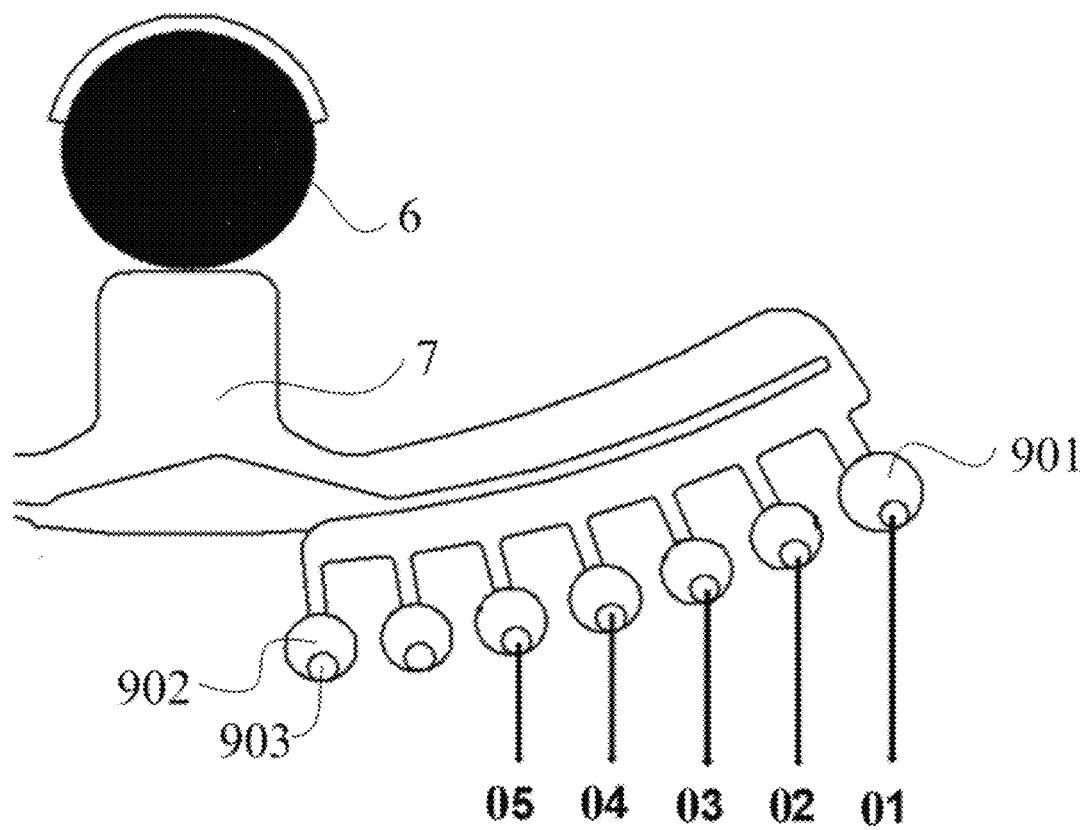
FIG. 2 is a schematic diagram of part of the sample extraction device according to an embodiment of the present disclosure.

As shown in FIGS. 1 and 2, a sample extraction chip according to an embodiment of the present disclosure includes a chip body 1 and a sample extraction module provided on the chip body 1.

The chip body 1 is a flat-shaped object with a predetermined thickness. There are or there are not through-holes, protrusions and recesses provided on the chip body 1. The chip body 1 has a rotation center. When the sample extraction chip rotates at a predetermined speed around a rotation axis that passes through the rotation center and is perpendicular to the chip body 1, the liquid in the sample extraction chip can flow, driven by centrifugal force or surface tension or both, from upstream units to downstream units through each flow channel.

The rotation center may be located inside or outside the sample extraction chip. In an embodiment, the chip body 1 is circular, and a central hole 101 is provided at the center of the chip body 1 to connect with other components to realize rotation.

The number of the sample extraction module may be one, two or more. In an embodiment, at least two sample extraction modules are provided, which are sequentially distributed along the rotation direction of the chip body 1.

The sample extraction module includes a sample-loading lysis unit 2, a liquid release-control unit 4, an extraction unit 6, a liquid switch-control unit 7, a liquid collection unit 8, and a sample collection unit 9 which are connected through flow channels in a sequence of extraction. The flow channels are fluid channels, and the fluid includes gas fluid and liquid fluid.

The sample-loading lysis unit 2 is configured to accommodate and lyse samples. The liquid release-control unit 4 is configured to store and release a liquid reagent required for the reaction. The type and category of the reagent may be selected according to actual needs, which is not limited in this application. The extraction unit 6 is configured to extract and refine the sample. The liquid switch-control unit 7 is configured to switch between communication of the liquid collection unit 8 and the extraction unit 6 as well as communication of the sample collection unit 9 and the extraction unit 6. The liquid collection unit 8 is configured to store the waste liquid after the extraction, and the sample collection unit 9 is configured to collect the extracted and refined sample.

The sample-loading lysis unit 2 and the liquid release-control unit 4 are both located upstream from the extraction unit 6, the liquid switch-control unit 7 is located downstream from the extraction unit 6, and the liquid collection unit 8 and the sample collection unit 9 are both located downstream from the liquid switch-control unit 7.

The sample extraction chip according to the embodiments realizes integrated and automatic extraction and purification of samples. After manually adding liquid and samples in one step, the biological reaction device according to the embodiments can run with one press with no manual operation during the entire process. This reduces the risk of pathogen infection of operators, avoids cross-contamination between samples, and improves the efficiency of sample preparation, and can promote the standardization, specialization and normalization of clinical sample genetic testing, and improve the level of precision medicine. Moreover, the chip is disposable and only needs to be equipped with a simple centrifugal device, which is compact and portable and low in cost.

In order to improve the purity of the extracted sample, the sample collection unit 9 includes a front collection portion 901 and a rear collection portion 902 which are both in communication with the liquid switch-control unit 7. The front collection portion 901 and the rear collection portion 902 are sequentially distributed along the rotation direction of the chip body 1. Samples flow into the front collection portion 901 first, and the into the rear collection portion 902. At least one of the rear collection portions 902 is provided with a sampling port 903.

For convenience, the front collection portion 901 and the rear collection portion 902 are referred to as collection portions. Each collection portion has only one liquid inlet and is connected to a microchannel of the upstream liquid switch-control unit 7 through the inlet. All the collection portions are sequentially distributed along the rotation direction of the chip body 1. The number of the front collection portion 901 and the rear collection portion 902 can be selected and designed according to actual needs. The number of the front collection portions 901 may be one, two or more. The number of the rear collection portions 902 may be one, two or more. In an embodiment, one front collection portion 901 and at least two rear collection portions 902 are provided, and each rear collection portion 902 has a sampling port 903.

The front collection portion 901 may or may not be provided with a sampling port 903, which can be provided as required.

Referring to FIG. 2, seven collection portions in total are provided, one front collection portion 901 and six rear collection portions 902. The capacity of the front collection portion 901 is 20 μL, and the capacity of the rear collection portion 902 is 15 μL. A nucleic acid amplification curve is obtained by performing tests on the front collection portion 901 and the first four rear collection portions 902. The front collection portion 901 and the first four rear collection portions 902 are respectively denoted as collection portion 01, collection portion 02, collection portion 03, collection portion 04, and collection portion 05.

Figure 3:
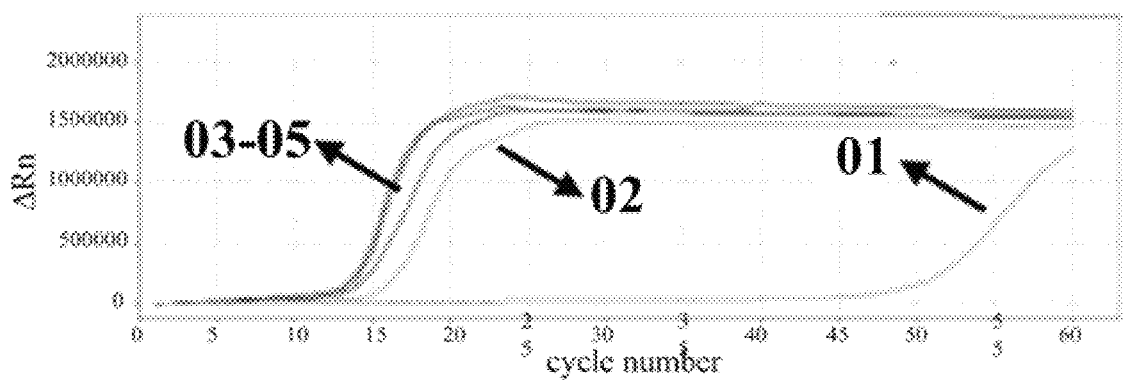
FIG. 3 is a comparison diagram of nucleic acid amplification curves of *Escherichia coli* obtained by using the sample extraction device according to an embodiment of the present disclosure.
Figure 4:
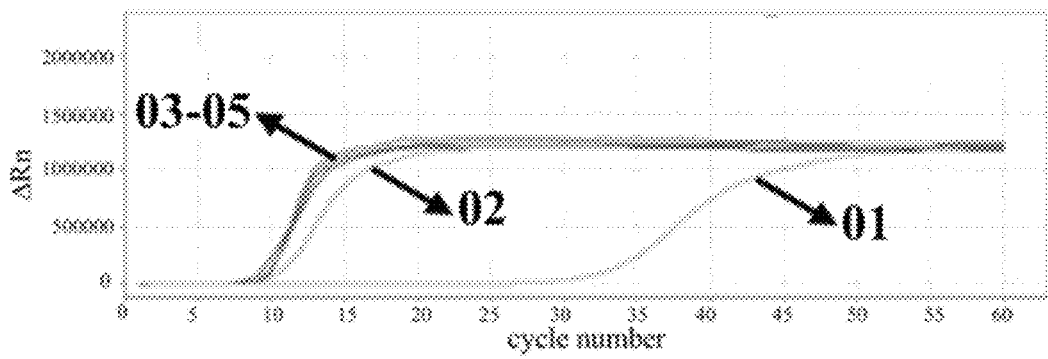
FIG. 4 is a comparison diagram of nucleic acid amplification curves of *Staphylococcus aureus* obtained by using the sample extraction device according to an embodiment of the present disclosure.

Taking *Escherichia coli* as the sample, FIG. 3 is the obtained nucleic acid amplification curve. Taking *Staphylococcus aureus* as the sample, FIG. 4 is the obtained nucleic acid amplification curve. Time positives of the nucleic acid amplification curves of the nucleic acids taken from the five collection portions are significantly different. The time positive of the amplification curve of the nucleic acid taken from the collection portion 01 is about 30 min to 50 min, while the time positive of the amplification curves of the nucleic acids taken from the collection portions 02, 03, 04 and 05 are about 7 min to 15 min. Therefore, it is suggested that the purity of the nucleic acids taken from the collection portions 02, 03, 04, and 05 is higher than the purity of the nucleic acid taken from the collection portion 01.

Therefore, in the actual application process, it is preferred to sample from the rear collection portion 902, so that the purity of the obtained sample is higher.

Figure 5:
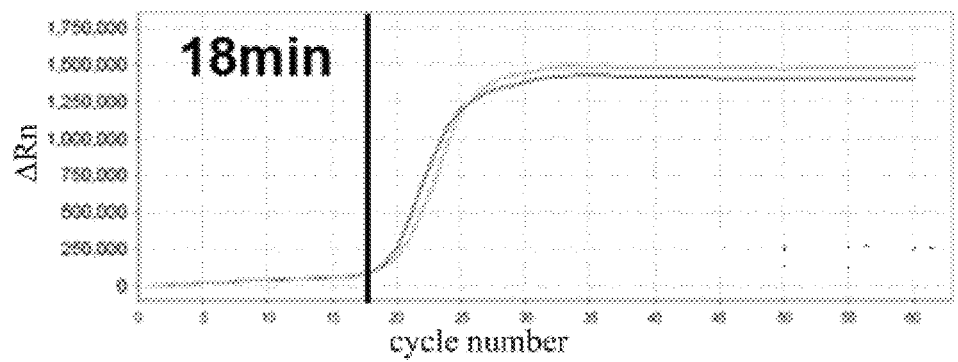
FIG. 5 is a diagram of nucleic acid amplification curves of *Staphylococcus aureus* obtained by using an existing sample extraction device.
Figure 6:
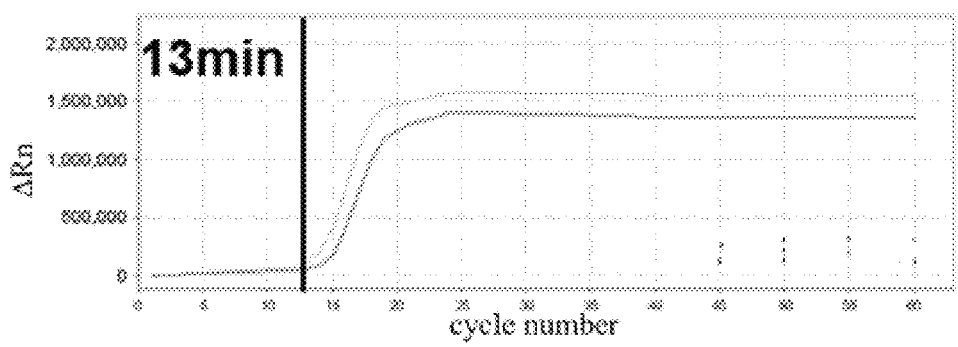
FIG. 6 is a diagram of nucleic acid amplification curves of *Staphylococcus aureus* obtained by using the sample extraction device according to an embodiment of the present disclosure.

A mixed collection of nucleic acids is realized by using an existing sample extraction chip with *Staphylococcus aureus* as the sample, and a nucleic acid amplification curve shown in FIG. 5 is obtained by amplifying the obtained nucleic acids. A segmented collection of nucleic acids is realized by using the sample extraction chip according to this embodiment with the same *Staphylococcus aureus* as the sample, nucleic acids are extracted from the rear collection portion 902, and a nucleic acid amplification curve shown in FIG. 6 is obtained by amplifying the obtained nucleic acids. The time positive of the amplification curve in FIG. 5 is 18 min, and the time positive of the amplification curve in FIG. 6 is 13 min. By comparing FIG. 5 with FIG. 6, it is suggested that all the time positives of the nucleic acid amplification of the nucleic acids obtained from the rear collection portion 902 are about 5 min earlier than the time positive of the mixed collection, and the nucleic acid amplification efficiency is improved by at least 10 times.

Figure 7:
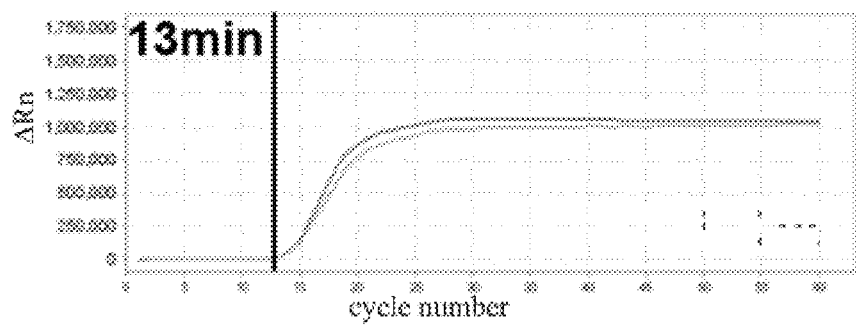
FIG. 7 is a diagram of nucleic acid amplification curves of *Escherichia coli* obtained by using an existing sample extraction device.
Figure 8:
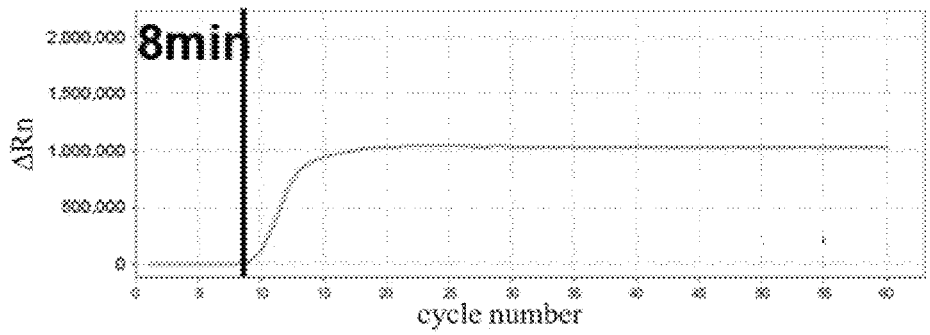
FIG. 8 is a diagram of nucleic acid amplification curves of *Escherichia coli* obtained by using the sample extraction device according to an embodiment of the present disclosure.

A mixed collection of nucleic acids is realized by using an existing sample extraction chip with *Escherichia coli* as the sample, and a nucleic acid amplification curve shown in FIG. 7 is obtained by amplifying the obtained nucleic acids. A segmented collection of nucleic acids is realized by using the sample extraction chip according to this embodiment with the same *Escherichia coli* as the sample, nucleic acids are extracted from the rear collection portion 902, and a nucleic acid amplification curve shown in FIG. 8 is obtained by amplifying the obtained nucleic acids. The time positive of the amplification curve in FIG. 7 is 13 min, and the time positive of the amplification curve in FIG. 6 is 8 min. By comparing FIG. 7 with FIG. 8, it is suggested that all the time positives of the nucleic acid amplification of the nucleic acids obtained from the rear collection portion 902 are about 5 min earlier than the time positive of the mixed collection, and the nucleic acid amplification efficiency is improved by at least 10 times.

In the sample extraction chip according to the above embodiment, the sample collection unit 9 includes the front collection portion 901 and the rear collection portion 902. Since the front collection portion 901 and the rear collection portion 902 are sequentially distributed along the rotation direction of the chip body 1, and the samples flow into the front collection portion 901 first, and then into the rear collection portion 902, the sample in the extraction unit sequentially enters the front collection portion 901 and the rear collection portion 902 from the liquid switch-control unit 7, and the front collection portion 901 collects the front-section sample, and the rear collection portion 902 collects the rear-section sample. Since at least one of the rear collection portion 902 has the sampling port 903, samples can be obtained from the rear collection portion 902 to obtain the rear-section sample. Affected by the centrifugal force, most of the impurities in the sample are in the front-section part. Most of the impurities are in the front collection portion 901, and there are fewer impurities in the rear collection portion 902. Therefore, with the sample extraction chip, segmented sample collection is realized, and the rear-section sample can be extracted, thereby effectively improving the purity of the extracted samples.

In the above sample extraction chip, the front collection portion 901 and the rear collection portion 902 are both collection portions. In order to ensure that there is a sample in each collection portion, the collection portions are evenly spaced along the rotation direction of the chip body 1.

The volume of each collection portion can be selected according to actual needs. In an embodiment, the volume of each of the front collection portion 901 is greater than the volume of each of the rear collection portion 902, as shown in FIG. 2. For example, the volume of the front collection portion 901 is 15 µL, to 25 µL. Further, the volume of the front collection portion 901 is 20 µL, and the volume of the rear collection portion 902 is 15 µL. It is also applicable that the volume of one certain rear collection portion 902 is greater than the volume of one certain front collection portion 901, which is not limited to the above embodiment.

It is also applicable that the volume size relationship of the collection portions may be other situations. In the actual application process, the purity of the sample in the last rear collection portion 902 is the highest. For experiments that require a large quantity of the samples, it is preferred that the last collection portion in the collection portions has the largest volume, that is, the last rear collection portion 902 has the largest volume, as shown in FIG. 1. It should be noted that the last rear collection portion 902 refers to the rear collection portion 902 into which the sample finally flows. In this way, the experiment needs can be met.

The volume of the sample collection unit 9 is the sum of the volumes of the front collection portion 901 and the rear collection portion 902, and the volume of the front collection portion 901 accounts for 20% to 30% of the volume of the sample collection unit 9. Correspondingly, the volume of the rear collection portion 902 accounts for 70% to 80% of the volume of the sample collection unit 9. In order to ensure normal operation, the sum of the volumes of the liquid released and stored by the liquid release-control unit 4 is smaller than the volume of the sample collection unit 9.

In the above sample extraction chip, the sampling port 903 needs to be sealed with a sealing member to avoid contamination of the sample. The sealing member may be tape, a cover, a plug, or a suction sac. In order to facilitate the sealing and extraction, the sealing member is preferably selected as the suction sac. In this way, after the nucleic acid preparation is completed, the suction sac may directly suck out the nucleic acids. After the suction operation is completed, the suction sac is covered on the sampling port 903. The operation is simple and no additional sampling device is required. It is further ensured that the sample extraction chip is in a completely closed state before or after use, which avoids contamination to the sample extraction chip from itself or the external environment.

The size and shape of the sampling port 903 can be selected according to actual needs. In order to facilitate sampling, the equivalent diameter of the sampling port 903 is 0.5 mm to 10 mm. The sampling port 903 may be a circle, quasi-circle, rounded rectangle or other polygon. The size and shape of the sampling port 903 are not limited in this embodiment.

The sample-loading lysis unit 2 mainly includes a sample inlet 201 and a lysis chamber.

The size and shape of the sample inlet 201 can be selected according to actual needs. For example, the sample inlet 201 is a circle or quasi-circle, rounded rectangle or other polygon with an equivalent diameter between 0.5 mm and 10 mm. In order to improve the versatility, the sample inlet 201 is a universal sample port, which can be used with various sample-loading devices, and can load and process different clinical samples including sticky sputum, lung lavage fluid, blood, urine, various swabs and difficult-to-handle stools, thereby improving the versatility of the sample extraction chip.

The sample inlet 201 may be sealed with tape, cover, plug or any other suitable object to avoid contamination. The material of the member for sealing the sample inlet 201 may be PC, PS, PP, COC, and COP, which is not limited in this application.

In the actual application process, an opening may be provided on the lysis chamber, the opening extends outside the lysis chamber, and the member for sealing the sample inlet 201 is sleeved on the opening. If it is required that the sample extraction chip shouldn't have too high protrusions, an opening in direct communication with the sample extraction chip may be provided on the lysis chamber, and the member for sealing the sample inlet 201 is directly embedded in the chip body 1, so that the protruding height of the sample extraction chip is the height of the cover of the member for sealing the sample inlet 201.

The sample-loading lysis unit 2 may adopt various lysis methods such as pyrolysis, chemical lysis, and mechanical lysis, as well as a lysis method of a combination of various methods, such as chemical-assisted mechanical grinding, thermal-assisted mechanical grinding and the like, so that the sample extraction chip can complete nucleic acid preparation for different targets such as fungi, bacteria, and viruses, and thereby the sample extraction chip has strong versatility.

The lysis chamber may be lateral or longitudinal. Reagents and other auxiliary media related to the reaction may be pre-stored in the lysis chamber or be added during use, such as lyophilized powders such as lysis solution and binding buffer solution. The reagents may be solid or liquid, and may be in various shapes such as tablet, pellet, powder or paste. The auxiliary media may be hard substrates with a diameter of about 0.1 mm to 0.5 mm, such as glass beads, silicic acid beads, and zirconia beads. In addition, the lysis chamber may be filled with magnetic hard media with a diameter of about 5 mm to 10 mm, such as neodymium iron boron magnets, samarium cobalt magnets, alnico magnets and other hard substrates with ferromagnetism.

Some large particles of impurities quickly reach the bottom of the lysis chamber by centrifugation. Therefore, the outlet of the lysis chamber is not at the bottom, and these impurities will not block the flow channel. The outlet of the lysis chamber is provided at one-third to one-half of the depth of the lysis chamber to ensure that the residue during the grinding process is deposited at the bottom of the chamber at a high speed. The equivalent diameter of an outlet channel 203 of the lysis chamber is 100 µm to 400 µm, which prevents broken beads from running out of the lysis chamber to block the flow channel. Preferably, the outlet channel 203 of the lysis chamber is a curved channel pointing to the rotation center, and the height of the curved channel is higher than the height of the liquid level of an adjacent fluid buffer pool 5 to prevent other fluids from entering the lysis chamber.

The outlet channel 203 of the lysis chamber is provided with a breaking opening, which may be round, square, etc., and the breaking opening may be treated by means of a hydrophobic reagent to ensure that the fluid will not enter the downstream pipeline in advance during sample loading or lysis. The breaking opening is a round or square structure on the outlet channel 203. Compared with the outlet channel 203, the breaking opening has a larger width or depth, so that the outlet channel 203 has no siphon force at the breaking opening, thereby preventing the fluid from flowing in the outlet channel 203 due to the siphon force.

The lysis chamber may be integrated with the chip body 1, or the lysis chamber and the chip body 1 may be different parts combined together. In an embodiment, the sample-loading lysis unit 2 includes a lysis device 202, and a sample inlet 201 provided on the lysis device 202, the sample inlet 201 is in communication with the lysis device 202, and the lysis device 202 and the chip body 1 are two independent parts. It should be noted that the lysis chamber mentioned above is the chamber of the lysis device 202.

In the above structure, the independent lysis device 202 is directly arranged on the chip body 1, which has the characteristics of high temperature resistance and grinding resistance, and can realize high temperature heating on the chip body 1, avoid the problems of liquid channeling and glue opening at high temperature, and realize the complete integrated functions of nucleic acid preparation.

Figure 9:
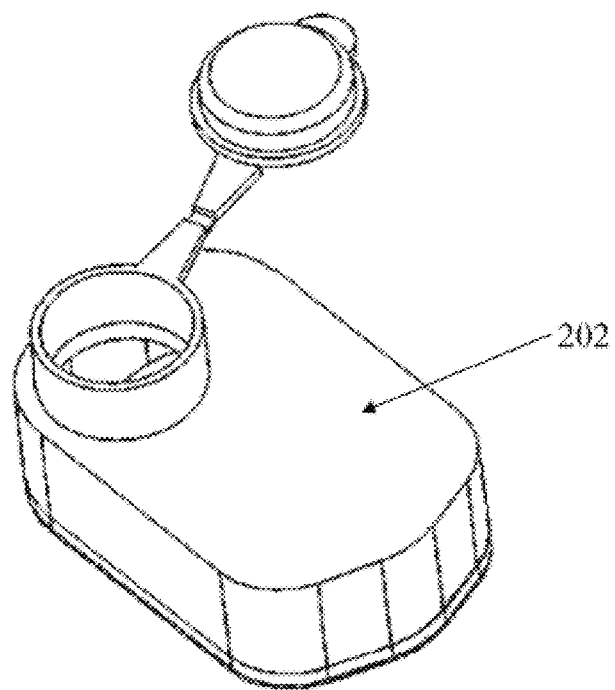
FIG. 9 is a schematic diagram showing the structure of a lysis device in the sample extraction device according to an embodiment of the present disclosure.
Figure 10:
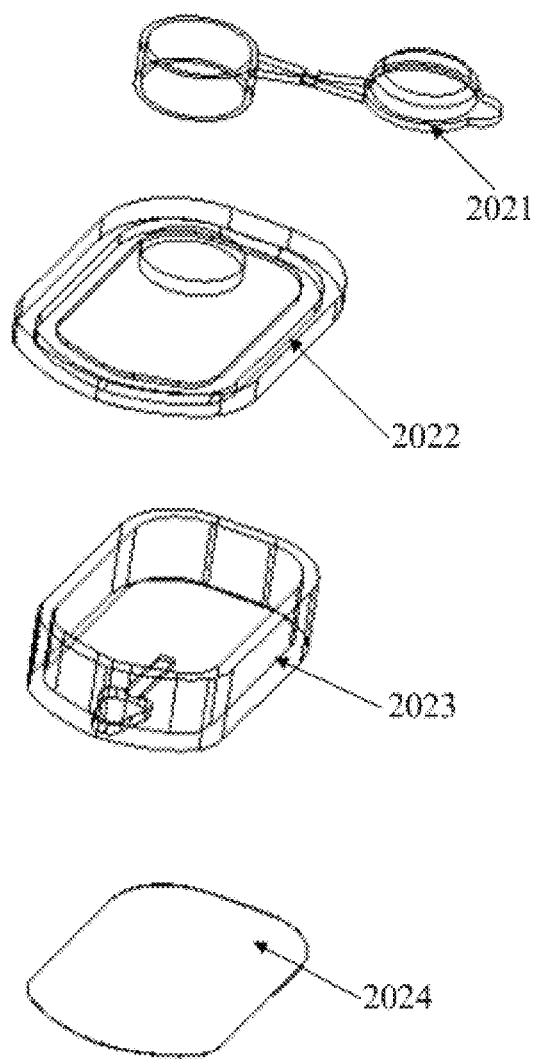
FIG. 10 is an explodedly schematic diagram of the lysis device in the sample extraction device according to an embodiment of the present disclosure.

In an embodiment, as shown in FIGS. 9 and 10, the lysis device 202 includes a lysis shell 2023 with ports at two ends, a sealing film 2024 that is connected with the lysis shell 2023 and configured to seal one port, and a sealing cover that is connected with the lysis shell 2023 and configured to seal the other port, and the sealing cover is provided with an opening in communication with the sample inlet 201.

Further, the sealing cover includes a sealing cover body 2022 and a cap 2021 connected to the sealing cover body 2022. The opening in communication with the sample inlet 201 may be provided on the cap 2021.

The liquid release-control unit 4 is configured to store and release the liquid. The liquid includes washing liquid and eluent. For ease of use, the liquid may be pre-stored on the chip. The storage device may be made of deformable materials such as plastic and aluminum foil, or the storage device may be a reagent loading part processed by substrates such as PMMA, PP, PC, or PS. The liquid can be released by extruding. For simplifying the difficulty of chip processing, a liquid reservoir may be directly provided, and the reagents can be released step-by-step by means of multi-stage capillary channels.

Figure 11:
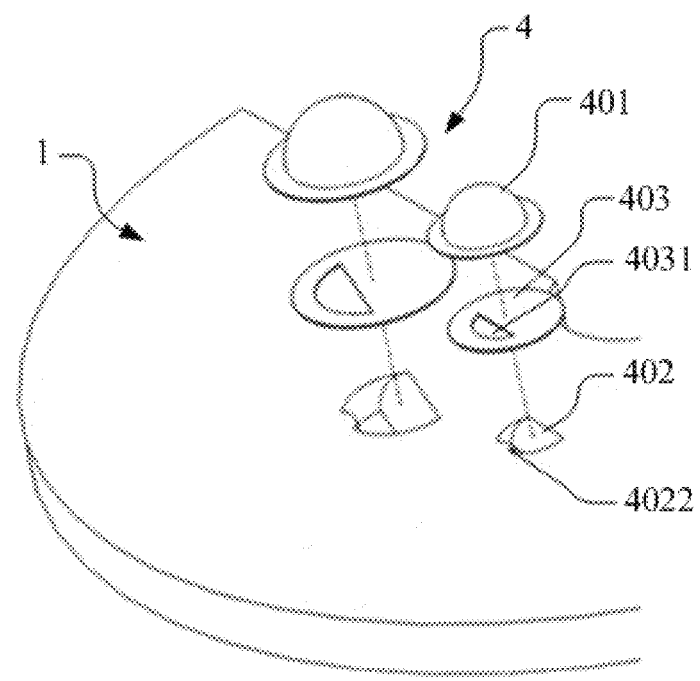
FIG. 11 is a schematic diagram showing one structure of a liquid release-control unit in the sample extraction device according to an embodiment of the present disclosure.
Figure 12:
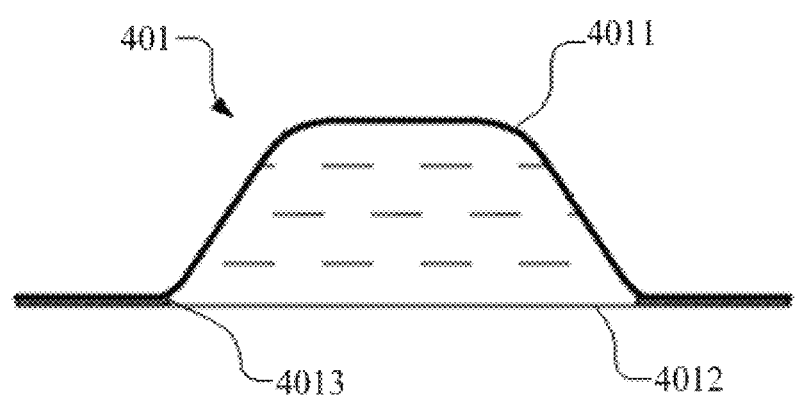
FIG. 12 is a sectional view of part of the liquid release-control unit in FIG. 11.
Figure 13:
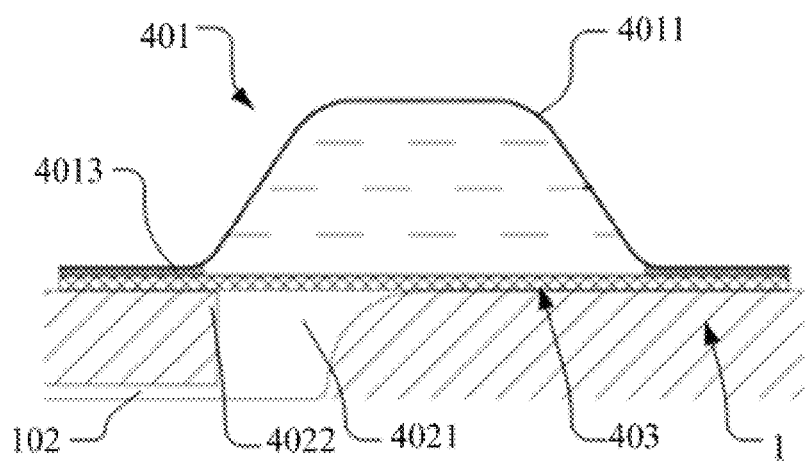
FIG. 13 is a sectional view of the liquid release-control unit in FIG. 11.

As shown in FIGS. 11 to 13, the liquid release-control unit 4 includes a liquid storage sac 401 and a fixed-position release chamber 402 tightly connected with the liquid storage sac 401.

The liquid storage sac 401 has a liquid storage cover 4011 that is deformable under pressure and a sealing layer 4012 that is configured to seal the liquid storage cover 4011, the space defined by the sealing layer 4012 and the liquid storage cover 4011 is configured to contain liquid, and the connection strength of a sealing region 4013 between the sealing layer 4012 and the liquid storage cover 4011 is greater than the strength required for rupture of the sealing layer 4012.

The fixed-position release chamber 402 has a guiding chamber 4021 for collecting liquid and a liquid release site 4022, and when an external force is applied to the liquid storage cover 4011, the liquid release site 4022 only pierces the sealing layer 4012 to cause the liquid storage sac 401 to communicate with the guiding chamber 4021.

When the liquid release-control unit 4 of the above structure is adopted, the liquid is encapsulated in the liquid storage sac 401. When the liquid storage cover 4011 is extruded by external force, the liquid in the liquid storage sac 401 is forced to expand and gradually approach the liquid release site 4022. When the liquid release site 4022 contacts the sealing layer 4012, the liquid release site 4022 pierces the sealing layer 4012, and the liquid storage sac 401 is in communication with the guiding chamber 4021, thereby realizing the full release of the liquid.

It can be seen that, in the above process, the liquid is stored in the space defined by the liquid storage cover 4011 and the sealing layer 4012. The storage of the liquid can be universalized, and compared with the prior art, the method of piercing the sealing layer 4012 to release the liquid has lower requirements for packaging, since the liquid release site is not located on the sealing region 4013. Moreover, since the liquid release site is located on the pierced sealing layer 4012, it can ensure that all the liquid is released, thus realizing quantitative release of the liquid after storage and reducing the impact of the inability to quantitatively release on the accuracy of subsequent test.

The release method of the above-mentioned liquid release-control unit 4 is simple. The liquid can be accurately and completely released downstream at a specific position by pressing the liquid storage sac 401, without liquid residue, and quantitative release can be achieved. Especially for applications of releasing multiple liquids in sequence, the stability and reliability of the applications can be improved.

The above-mentioned liquid release-control unit 4 has good sealing effect and small volatilization, which can realize long-term storage of reagents.

The liquid storage sac 401 and the fixed-position release chamber 402 are tightly connected, and the tight connection is achieved by a connecting layer 403, welding or jigs. Any method that can realize the tight connection between the liquid storage sac 401 and the fixed-position release chamber 402 shall fall within the scope of protection of the present disclosure.

The shape of the connecting layer 403 is the same as the shape of the sealing layer 4012. In addition to the function of connecting the liquid storage sac 401 with the fixed-position release chamber 402, the connecting layer 403 further plays a role of buffering and protecting the sealing layer 4012. The connecting layer 403 completely covers the sealing layer 4012, and the liquid storage sac 401 is connected with the fixed-position release chamber 402 through the connecting layer 403. When the liquid storage sac 401 is pressed, the liquid release site 4022 sequentially pierces the connecting layer 403 and the sealing layer 4012 to release liquid.

Alternatively, a material missing region 4031 is provided in a portion of the connecting layer 403 corresponding to the guiding groove. That is, a through hole is provided in the portion of the connecting layer 403 corresponding to the guiding groove. The material missing region 4031 is circular, semicircular or oval. The liquid storage sac 401 is connected with the fixed-position release chamber 402 through the connecting layer 403. The connecting layer 403 has the material missing region 4031. The connecting layer 403 shields the regions other than the liquid release site 4022. When the liquid storage sac 401 is pressed, the liquid release site 4022 directly contacts the sealing layer 4012, and the sealing layer 4012 is pierced, and other regions are buffered by the connecting layer 403, releasing the liquid.

The shape of the connecting layer 403 is consistent with the shape of the sealing layer 4012, and the area of the connecting layer 403 is less than, equal to, or greater than the area of the sealing layer 4012. When the connecting layer 403 completely coincides with the sealing layer 4012, that is, under the premise of same shape, the two have the same areas, and the material missing region 4031 is tangent or partially overlapped with the sealing region 4013 of the sealing layer 4012 at the radially outermost end of the connecting layer 403.

In an embodiment, the liquid storage cover 4011 is in the shape of a bell or an inverted bowl, and the liquid storage cover 4011 is deformable and is able to collapse inward when subjected to a predetermined external pressure. It is also applicable that the liquid storage cover 4011 is in other shapes, which is not limited in this application.

The liquid release-control unit 4 may be configured as the sealing layer 4012 is able to slightly deform outward when subjected to an internal liquid pressure and to rupture when subjected to a large internal liquid pressure. In this case, there is no need to provide the liquid release site 4022.

The material of the liquid storage sac 401 has good airtightness, volatility resistance and chemical compatibility for the stored liquid. After the liquid storage sac 401 is sealed, the composition and mass of the stored liquid can be kept relatively stable for a long time. In particular, the liquid storage cover 4011 is mainly made of a polymer film with a predetermined toughness, and the outer surface of the liquid storage cover may or may not be covered with a layer of metal material. The sealing layer 4012 is mainly made of a brittle metal film that is easy to rupture under pressure, and the inner surface of the sealing layer may or may not be covered with a layer of polymer material.

The main component of the above-mentioned polymer film and polymer material may be PVC, PP, PE, or PET, etc., and the main component of the metal film and metal material may be aluminum foil or tin foil.

The volume of the liquid reagent stored in the liquid storage sac 401 accounts for 40% to 100%, preferably 60% to 90%, of the volume of the recess of the liquid storage cover 4011.

In an embodiment, the guiding chamber 4021 is a guiding groove recessed downwardly and provided on the chip body 1, the guiding groove is in communication with a downstream microchannel 102, and the inlet of the guiding groove is completely covered by the sealing layer 4012. This ensures that all the internal channels of the liquid release-control unit 4 are isolated from the outside.

The volume of the guiding groove is smaller than, equal to or larger than the volume of the liquid storage sac 401, so that the guiding groove can accommodate part or all of the liquid in the liquid storage sac 401. Preferably, the volume of the guiding groove is equal to the volume of the liquid storage sac 401.

The function of the liquid release site 4022 is to pierce the sealing layer 4012. The liquid release site 4022 is directly arranged on the wall of the guiding groove, on the inlet of the guiding groove or in the cavity of the guiding groove. The liquid release site 4022 is integrated with the guiding groove or the two are fixed together by bonding or other processes. In a case that the liquid release site 4022 is integrated with the guiding groove, the liquid release site 4022 extends from the wall of the guiding groove to the cavity of the guiding groove, and an end of the liquid release site 4022 corresponds to part of the sealing region 4013 of the sealing layer 4012. The shape and size of the liquid release site 4022 can be in arbitrary forms which are convenient for placement or integrated processing, as long as the shape and size can ensure that, the reaction force of the liquid release site 4022 on the sealing layer 4012 can make the sealing layer 4012 rupture, while no leakage or rupture occurs in other positions when the pressure is transmitted downward through the top of the liquid storage sac to the sealing layer 4012 and the sealing region 4013 to cause the sealing layer 4012 to expand downward and be in contact with the liquid release site 4022. The distance between the highest point of the liquid release site 4022 and the sealing layer 4012 is not greater than the distance between the upper surface of the chip body 1 and the sealing layer 4012, thereby ensuring that the liquid release site 4022 is not in contact with the sealing layer 4012 when the liquid storage sac 401 is not pressed.

In order to ensure that there is only one reliable liquid release site 4022 on the guiding groove, the edge of the wall of the guiding groove where the liquid release site 4022 is not provided has a rounded structure.

In a case that the above-mentioned liquid release-control unit 4 is used in the sample extraction chip, the liquid release-control unit 4 may be used independently, or multiple liquid release-control units may be used in combination according to requirements, so as to realize the pre-storage of various types of reagents and the sequential release of reagents. In a case that multiple liquid release-control units 4 are used in combination, these liquid release-control units may be arranged in a straight line or in an arbitrary arrangement. In order to balance the system, it is preferred that the liquid release-control units 4 are arranged in a circular array on a circle of equal radius.

Figure 14:
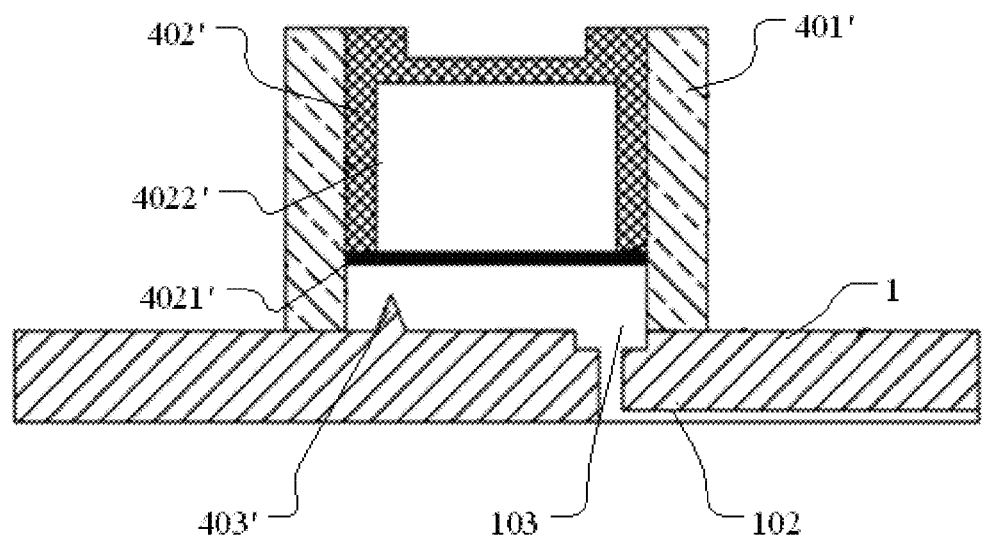
FIG. 14 is a schematic diagram showing another structure of the liquid release-control unit in the sample extraction device according to an embodiment of the present disclosure.

In the above-mentioned sample extraction chip, the liquid switch-control unit may be selected as another structure. As shown in FIG. 14, the liquid release-control unit 4 includes:
a sliding chamber 401' provided on the chip body 1,
a liquid storage chamber 402' provided inside the sliding chamber 401', and
a thorn 403' provided on the chip body 1 and corresponding to the sealing film 4021',
and the chip body 1 is provided with a liquid discharge port 103, and the liquid discharge port 103 is in communication with the downstream microchannel 102;
the liquid storage chamber 402' tightly cooperates with the sliding chamber 401' and is movable toward the chip body 1, a sealing film 4021' is provided at one end of the liquid storage chamber 402' close to the chip body 1, and a storage cavity 4022' for storing liquid is defined by the sealing film 4021' and the inner wall of the liquid storage chamber 402'; and
when the liquid storage chamber 402' is forced to move to contact with the thorn 403', the sealing film 4021' ruptures.

In a case that the above-mentioned liquid release-control unit 4 is used, the liquid storage chamber 402' is pushed to move toward the chip body 1. When the sealing film 4021' is in contact with the thorn 403', the thorn 403' pierces the sealing film 4021', and the liquid flows out of the liquid storage chamber and flows into the downstream microchannel 102 through the liquid discharge port 103. Since the liquid release site is on the pierced sealing film 4021', it can be ensured that all the liquid is released, thus realizing quantitative release of the liquid after storage and reducing the impact of the inability to quantitatively release on the accuracy of subsequent test.

In order to reduce the dead angle of liquid discharge, in this embodiment, the thorn 403' corresponds to the inner wall of the liquid storage chamber 402'. That is, the position where the thorn 403' pierces the sealing film 4021' is flush with the inner wall of the liquid storage chamber 402', so that there is no sealing film 4021' at the rupture position, thereby reducing the occurrence of dead angles of liquid discharge.

The thorn 403' is a protrusion with a predetermined hardness and strength and a sharp tip.

The sliding chamber 401' has a barrel-shaped structure, and the top opening of the sliding chamber 401' has a straight cylindrical structure or an open tapered structure.

Preferably, the top opening of the sliding chamber 401' has the open tapered structure. In this way, the liquid storage chamber 402' can be prevented from sliding upward out of the sliding chamber 401'.

The inner wall of the sliding chamber 401' and the outer wall of the liquid storage chamber 402' are both cylindrical. In addition to sliding up and down in the sliding chamber 401', the liquid storage chamber 402' is able to rotate under the action of external force around the central axis of the cylinder in the sliding chamber 401'.

The outer wall of the liquid storage chamber 402' is rotatably connected with the inner wall of the sliding chamber 401', or the outer wall of the liquid storage chamber 402' is connected with the inner wall of the sliding chamber 401' through threads. In a case that the outer wall of the liquid storage chamber 402' is rotatably connected with the inner wall of the sliding chamber 401', a sealing ring is provided between the outer wall of the liquid storage chamber 402' and the inner wall of the sliding chamber 401'.

The above-mentioned sealing film 4021' may be of a single-layer or multi-layer film. The sealing film 4021' may be mainly made of a polymer film, and the outer surface of the sealing film may or may not be covered with a layer of metal material. The sealing film may be mainly made of a metal film, and the inner surface of the sealing film may or may not be covered with a layer of polymer material. The main component of the polymer film may be PVC, PP, PE, or PET, etc., and the main component of the polymer material may be hot melt adhesive, twin adhesive, or ultra-violet adhesive, etc. The main component of the metal film may be aluminum foil, tin foil, etc.

In the above-mentioned sample extraction chip, the liquid release-control unit 4 may be selected as another structure. The liquid release-control unit 4 includes a liquid storage chamber and a liquid flow-control unit located downstream from the liquid storage chamber, and the liquid flow-control unit is located between the sample-loading lysis unit 2 and the extraction unit 6.

The liquid flow-control unit may have various structures. The liquid flow-control unit is a capillary channel, an inlet of the capillary channel is closer to the rotation center of the chip body 1 than an outlet of the capillary channel, and a maximum distance from the capillary channel to the surface of the chip body 1 is greater than a distance from the inner wall of the sample-loading lysis unit 2 to the surface of the chip body 1.

The capillary channel is a curved channel. The inlet of the curved channel is in communication with an outlet of an upstream unit or a liquid chamber. The outlet of the curved channel is lower than the inlet of the curved channel, that is, the outlet of the curved channel is farther from the rotation center than the inlet of the curved channel. The highest point of the curved channel is referred to as the apex of the curved channel, which is higher than the inner wall of the upstream unit or the liquid chamber.

In a case that the above-mentioned liquid flow-control unit is a capillary channel, multiple liquid flow-control units may be connected in series end to end to form a multi-stage flow-control unit.

The shape and size of the capillary channel may be selected according to actual needs. The cross section of the capillary channel may be rectangular, trapezoidal, semicircular, circular or any other shape, and the equivalent diameter of the cross section of the capillary channel is between 0.05 mm and 0.5 mm.

The surface of the inner wall or part of the inner wall of the capillary channel is hydrophilic. The hydrophilic surface is a sodium dodecyl sulfate layer, a polyethylene glycol octyl phenyl ether layer, an agarose layer, a polyoxyethylene sorbitan fatty acid ester layer or a polypeptide layer. In this way, it is more conducive for the liquid to flow in the capillary channel under the drive of surface tension.

The equivalent diameters of the capillary channel at different positions may be different. Preferably, a passive blocking pipe section is provided between the inlet of the capillary channel and the apex of the capillary channel, the equivalent diameter of the passive blocking pipe section is greater than the equivalent diameter of the capillary channel, and the surface of the inner wall or part of the inner wall of the passive blocking pipe section is hydrophobic; wherein the apex of the capillary channel is the position where the distance from the capillary channel to the surface of the chip body 1 is the largest.

The hydrophobic-type surface treatment is performed on the inner wall or part of the inner wall of the passive blocking pipe section. For the liquid to pass through the passive blocking pipe section, the contact angle between the fluid and the processed surface is greater than the contact angle between the fluid and an untreated surface. The treated surface is more unfavorable for the liquid to pass through the passive blocking pipe section under the drive of surface tension.

The above-mentioned liquid flow-control unit may be of other structure. The above-mentioned liquid flow-control unit includes a flow control pipeline and a blocked pipeline connected in series with the flow control pipeline, the equivalent diameter of the flow control pipeline is smaller than the equivalent diameter of the blocked pipeline, the blocked pipeline is pre-buried with a hot melt component, and the blocked pipeline is blocked by the hot melt component.

Preferably, the blocked pipeline is located at a position close to the outlet of the flow control pipeline, the distance from the blocked pipeline to the outlet of the flow control pipeline is not greater than the length of the blocked pipeline, and a pipeline of the flow control pipeline located between the blocked pipeline and the outlet of the flow control pipeline is consistent with a radial direction of the chip body 1.

The flow control pipeline may be straight or curve, the cross section of the flow control pipeline may be rectangular, trapezoidal, semicircular, circular or any other shape, and the equivalent diameter of the cross section of the flow control pipeline is between 0.2 mm and 2 mm.

The melting point of the hot melt material of the above-mentioned hot-melt component is between 35° C. and 100° C. The main component of the hot-melt component is paraffin wax or the like.

The above-mentioned liquid flow-control unit may be of other structure. The above-mentioned liquid flow-control unit includes a flow control pipeline and a flow resistance element connected in series with the flow control pipeline, and when the hydraulic pressure in the flow control pipeline is not greater than a preset pressure, the flow resistance element is able to prevent the liquid from passing through the flow control pipeline; when the hydraulic pressure in the flow control pipeline is greater than the preset pressure, the flow resistance element allows the liquid to pass through the flow control pipeline.

The flow resistance element is a section of slender pipe with an equivalent diameter of less than 0.1 mm and a length of more than 3 mm.

The flow resistance element may be a section of pipe filled with porous material. The porous material may be a whole or multiple pieces with pores made of filter paper, knitted, or resin material, and the material may be block-shaped, net-shaped, layer-shaped or sponge-shaped. The porous material may be formed by dense combination of small particles, and the small particles may be made of resin, ceramic, glass or the like.

The above-mentioned sample extraction chip further includes a fluid buffer pool 5, which is located upstream from the extraction unit 6 and downstream from the sample-loading lysis unit 2 and the liquid release-control unit 4.

The fluid buffer pool 5 is able to ensure that the rinsing solution and the eluent do not enter the lysis chamber and the fluid in the lysis chamber does not enter the reagent storage chamber of the liquid release-control unit 4. Moreover, the fluid is easily centrifuged down under the action of centrifugal force.

In the above-mentioned sample extraction chip, the extraction unit 6 includes a fluid chamber and an extraction adsorption component located in the fluid chamber, one fluid chamber is provided, or two fluid chambers are provided, namely an upstream fluid chamber and a downstream fluid chamber, the upstream fluid chamber and the downstream fluid chamber are connected in series, and the extraction adsorption component is filled in the downstream fluid chamber.

Preferably, the fluid chamber is a circular chamber with a diameter of 4 mm to 8 mm. The circular chamber can ensure the largest effective area in the smallest radial space, and no liquid will remain in the circular chamber. A solid-phase nucleic acid adsorptive substrate used in the extraction absorption component may be a silica substrate, magnetic beads, or anion exchange columns.

The fluid chamber has at least two upstream fluid inlets and one downstream fluid outlet. In a case that two fluid chambers are provided, the upstream fluid chamber has multiple fluid inlets, and the downstream fluid chamber has one fluid outlet.

The amount of liquid that can be accommodated in the first fluid chamber in the extraction unit 6 is larger than the larger one that can be accommodated in the sample-loading lysis unit 2 and the liquid release-control unit 4.

Furthermore, the whole or a rear end of fluid chamber filled with the extraction adsorption component is tapered along the flow direction of the fluid. In this way, it is convenient for the extraction adsorption component to adsorb, and the adsorption effect is improved, thereby improving the extraction effect. The whole fluid chamber or the rear end thereof has a funnel-shaped structure.

The extraction adsorption component is made of porous biomacromolecule adsorption material, and the porous biomacromolecule adsorption material is silica fibers or particles or loose membranes, ion exchange resins, silica nanoparticles, magnetic particle materials with silica on the surface, porous materials coated with silica nanomaterials on the surface, porous materials coated with chitosan on the surface, or various other porous materials with silanol modification on the surface.

The porous biomacromolecule absorption material is loose-film shaped, lamellar or granular, the loose film may be of a single-layer or multi-layer film, and includes layers of different sizes or particles of different sizes. The fluid chamber may be filled with porous biomacromolecule adsorption materials of a same kind, or be filled with porous biomacromolecule adsorption materials of different kinds.

In the above-mentioned sample extraction chip, the liquid flow-control unit may be a mechanical valve or a Coriolis-type switch valve for separating the waste liquid and the collection liquid. The waste liquid mainly includes lysate and rinsing solution, and the collection liquid is nucleic acid eluent.

Figure 15:
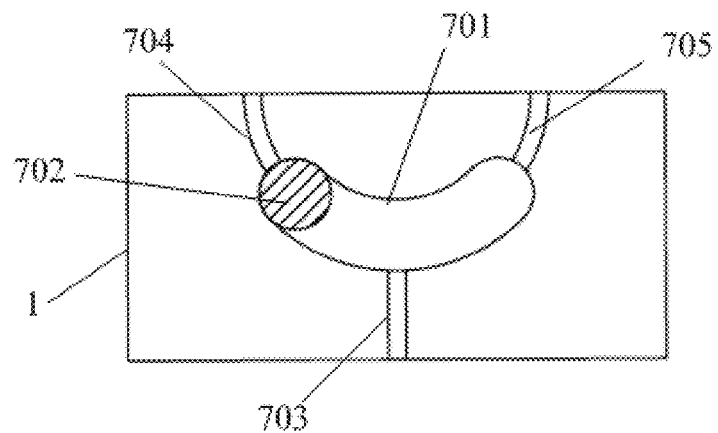
FIG. 15 is a schematic diagram showing the structure of a liquid switch-control unit in the sample extraction device according to an embodiment of the present disclosure.
Figure 17:
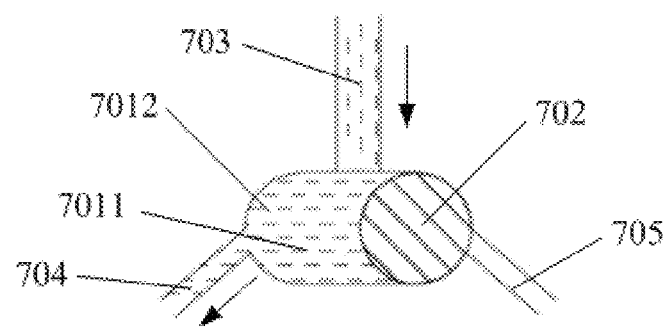
FIG. 17 is a schematic diagram showing another communication manner of the liquid switch-control unit in the sample extraction device according to an embodiment of the present disclosure.

Preferably, as shown in FIGS. 15 and 17, the liquid switch-control unit 7 includes a valve seat 701, a valve core 702, an upstream fluid channel connecting pipe 703, two downstream fluid channel connecting pipes, and a drive component.

The valve seat 701 includes:
  a valve core movement channel 7011, and
  a first valve core stop position 7013 and a second valve core stop position 7012 both of which are in the valve core movement channel 7011,
  the upstream fluid channel connecting pipe 703 and the downstream fluid channel connecting pipes are all in communication with the valve core movement channel 7011, the driving component is configured to drive the valve core 702 to move by magnetic force,
  when the valve core 702 is at the first valve core stop position 7013, the upstream fluid channel connecting pipe 703 is in communication with one of the downstream fluid channel connecting pipes; and
  when the valve core 702 is at the second valve core stop position 7012, the upstream fluid channel connecting pipe 703 is in communication with the other one of the downstream fluid channel connecting pipes.

One of the downstream fluid channel connecting pipes in communication with the liquid collection unit 8, and the other one of the downstream fluid channel connecting pipes is in communication with the sample collection unit 9.

The first valve core stop position 7013 is arranged between one end of the valve core movement channel 7011 and one of the downstream fluid channel connecting pipes, and the second valve core stop position 7012 is arranged in the valve core movement channel 7011 or between the valve core movement channel 7011 and the other one of the downstream fluid channel connecting pipes. The shape of the inner wall at the first valve core stop position 7013 and/or the second valve core stop position 7012 matches with the shape of the outer wall of the valve core 702.

Figure 16:
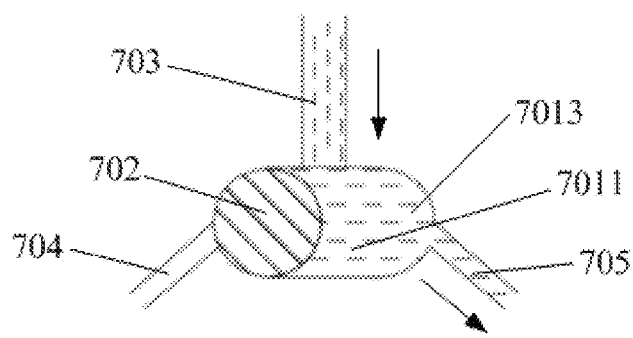
FIG. 16 is a schematic diagram showing one communication manner of the liquid switch-control unit in the sample extraction device according to an embodiment of the present disclosure.

The two downstream fluid channel connecting pipes respectively are a first downstream fluid channel connecting pipe 704 and a second downstream fluid channel connecting pipe 705. As shown in FIG. 16, when the valve core 702 is at the second valve core stop position 7012, the upstream fluid channel connecting pipe 703 is in communication with the second downstream fluid channel connecting pipe 705. As shown in FIG. 17, when the valve core 702 is at the first valve core stop position 7013, the upstream fluid channel connecting pipe 703 is in communication with the first downstream fluid channel connecting pipe 704.

Furthermore, the above-mentioned valve seat 701 is an arc-shaped pipe, and the arc-shaped pipe protrudes toward the rotation center of the chip body 1, the upstream fluid channel connecting pipe 703 is located in the middle of the arc-shaped pipe, and the two downstream fluid channel connecting pipes are respectively located at two ends of the arc-shaped pipe.

The valve core 702 is made of ferromagnetic material and is spherical. The first valve core stop position 7013 and the second valve core stop position 7012 are located at two ends of the arc-shaped pipe, and end portions of the arc-shaped pipe is able to be in close contact with the magnetic ball to seal the liquid outlet.

In the above-mentioned sample extraction chip, the liquid switch-control unit 7 may be of other structure. As shown in FIGS. 1 and 2, the liquid switch-control unit 7 includes a deflection cavity with a set size in the radial direction and the normal direction of the chip body 1 and in the direction perpendicular to the chip body 1, an upstream liquid inlet is provided on one side of the deflection cavity close to the rotation center of the chip body 1, two downstream liquid outlets are provided on one side of the deflection cavity away from the rotation center of the chip body 1, and the two downstream liquid outlets are respectively located at two ends of the deflection cavity.

In the above structure, the switch of communication direction of the liquid switch-control unit 7 is realized by controlling the rotation direction of the chip body 1. For example, when the chip body 1 rotates clockwise, the upstream liquid inlet communicates with one of the downstream liquid outlets; and when the chip body 1 rotates counterclockwise, the upstream liquid inlet communicates with the other one of the downstream liquid outlets.

It can be understood that, the upstream liquid inlet is in communication with the fluid outlet of the extraction unit 6, one of the downstream liquid outlets is connected to the liquid collection unit 8, and the other one of the downstream liquid outlets is connected to the sample collection unit 9.

The size of the deflection cavity can be selected according to actual needs. Preferably, the size of the deflection cavity in the radial direction is in a range of 1 mm to 10 mm, the size in the normal direction is in a range of 1 mm to 10 mm, and the size in the direction perpendicular to the chip body 1 is in a range of 0.2 mm to 5 mm.

The upstream liquid inlet of the deflection cavity is arranged on the inner side of the deflection cavity close to the rotation center, and the size of cross-section of the upstream liquid inlet is in a range of 0.1 mm to 1 mm. The out profile of the deflection cavity has a hillside shape with a higher middle and two lower sides, and the highest point of the hillside shape is not directly above the center of the bottom side of the hillside shape, that is, the hillside shape is asymmetrical.

The deflection cavity may have other shapes or structures, which is not limited to the above embodiment.

In order to more easily achieve the function of the deflection cavity, it is preferred that the contact angle between the inner surface of the deflection cavity and the liquid flowing therethrough is greater than 55 degrees. The effect of the contact angle between the inner surface of the deflection cavity and the liquid flowing therethrough is obtained by appropriate chemical treatment on the inner surface of the cavity.

In the above-mentioned sample extraction chip, the liquid collection unit 8 is a C-shaped or inverted C-shaped liquid storage chamber. A front end of the liquid storage chamber is provided with a liquid inlet in communication with the upstream, and the volume of the second half of the liquid storage chamber is larger than the sum of the volumes of the liquid that can be released by the sample-loading lysis unit 2 and the liquid release-control unit 4.

The liquid storage chamber is pre-filled with a liquid-absorbing material, which may be sponge, silicon membrane paper, absorbent cotton, water-absorbing resin particles, dehydrated agarose gel particles, or other water-absorbing agents or porous liquid-absorbing materials.

The liquid collection unit 8 is in communication with the sample-loading lysis unit 2 and the liquid release-control unit 4 through a thin pipe, which is able to discharge air outside when the liquid located upstream from the liquid collection unit 8 enters the liquid collection unit 8.

In the above-mentioned sample extraction chip, the sample collection unit 9 is connected to an outlet of the liquid switch-control unit 7, and a junction between the sample collection unit 9 and the liquid switch-control unit 7 is able to be connected to one or more liquid release-control units 4 through another thin pipe. This thin pipe is able to discharge air outside when the liquid located upstream from the sample collection unit 9 enters the sample collection unit 9.

In the above-mentioned sample extraction chip, a gas pipeline 3 is provided to maintain normal air pressure. The gas pipeline 3 includes a waste-liquid-pool gas path and a collection-pool gas path. Under the action of centrifugal force, the airflow in the lysate flows through the extraction unit 6 and returns to the lysis chamber through the waste-liquid-pool gas path; the airflow inside a washing-liquid storage pool also flows through the extraction unit 6 and returns to the washing-liquid storage pool through the waste-liquid-pool gas path; and the airflow inside a eluent storage pool also flows through the extraction unit 6 and returns to the eluent storage pool through the collection-pool gas path. The entire path is circulating, which ensures the circulation of internal gas and maintains air pressure balance.

The washing-liquid storage pool and the eluent storage pool are structures in the liquid release-control unit 4 for storing liquid.

In order to more specifically describe the sample extraction chip according to this disclosure, two specific embodiments are provided below.

1. Embodiment of Nucleic Acid Preparation from Sputum Sample

The above-mentioned sample extraction chip can be used for the nucleic acid preparation from sputum sample. The collected sputum mixed sample is added to the lysis device 202 through the sample inlet 201. Chemical reagents and lysis medium are pre-stored in the lysis device 202, and magnetic materials are provided at the bottom inside the lysis device 202, which ensures that the lysis medium in the lysis device 202 can be driven to move during rotation. Bacteria in the sputum sample are lysed during the movement. After the lysis is completed, the lysate flows through the extraction unit 6 through the outlet of the lysis device 202 under a predetermined centrifugal force. The liquid switch-control unit 7 communicates the extraction unit 6 with the liquid collection unit 8, so that the waste liquid enters the liquid collection unit 8. At this time, a first-level siphon valve of the liquid release-control unit 4 penetrates through a first-level hydrophobic area and reaches an end of a first-level siphon pipe, and a second-level siphon valve also penetrates through the first-level hydrophobic area and reaches a second-level hydrophobic area. Under a predetermined centrifugal force, the first-level siphon valve releases the washing liquid, and the liquid switch-control unit 7 communicates the extraction unit 6 with the liquid collection unit 8, so that the washing liquid enters the liquid collection unit 8 through the extraction unit 6. At this time, the second-level siphon valve of the liquid release-control unit 4 penetrates through the second-level hydrophobic area and reaches an end of a second-level siphon pipe. Under a predetermined centrifugal force, the second-level siphon valve releases the eluent, and the liquid switch-control unit 7 communicates the extraction unit 6 with the sample collection unit 9, so that the extracted sample enters the sample collection unit 9 through the extraction unit 6. Then, the nucleic acid sample can be taken out for use through the sampling port 903 of the sample collection unit 9. In the whole process, internal air pressure balance is achieved through the gas pipeline 3.

2. Embodiment of Nucleic Acid Preparation from Sputum/Blood Sample

The above-mentioned sample extraction chip can be used for the nucleic acid preparation from sputum/blood sample. The pre-processed sputum/blood sample is added to the lysis device 202 through the sample inlet 201. Chemical reagents and lysis medium are pre-stored in the lysis device 202, and magnetic materials are provided at the bottom inside the lysis device 202, which ensures that the lysis medium in the lysis device 202 can be driven to move during rotation. Bacteria in the sputum/blood sample are lysed during the movement. After the lysis is completed, the liquid switch-control unit 7 is switched to the flow path in communication with the liquid collection unit 8, and the lysate flows through the extraction unit 6 through the outlet of the lysis device 202 and enters the liquid collection unit 8 under a predetermined centrifugal force. At this time, the washing-liquid storage sac of the liquid release-control unit 4 is mechanically crushed and the washing liquid is released, the liquid switch-control unit 7 is switched to the flow path in communication with the liquid collection unit 8, and the released washing liquid enters the liquid collection unit 8 through the extraction unit 6 under a predetermined centrifugal force. Then, the eluent storage sac of the liquid release-control unit 4 is mechanically crushed and the eluent is released, the liquid switch-control unit 7 is switched to the flow path in communication with the sample collection unit 9, and the released eluent enters the sample collection unit 9 through the extraction unit 6 under a predetermined centrifugal force. The front-section sample in the front collection portion 901 is discarded, and the rear-section sample in the rear collection portion 902 is collected. Then, the nucleic acid sample can be taken out for use through the sampling port 903. In the whole process, internal air pressure balance is achieved through the gas pipeline 3.

Based on the sample extraction chip according to the above embodiments, a biological reaction device is further disclosed according to the embodiments, which includes the sample extraction chip according to any one of the above embodiments.

Since the sample extraction chip according to the above embodiments has the above technical effects and the biological reaction device has the sample extraction chip, the biological reaction device surely has corresponding technical effects, which will not be repeated here.

Based on the above description of the disclosed embodiments, those skilled in the art are capable of carrying out or using the present disclosure. Various modifications to these embodiments are obvious to a person skilled in the art, and the general principles defined herein may be implemented in other embodiments without departing from the spirit and scope of the present disclosure. Therefore, the present disclosure is not limited to these embodiments illustrated herein, but shall conform to the broadest scope consistent with the principle and novel features disclosed herein.

The invention claimed is:

1. A sample extraction chip, comprising:
a chip body; and
a sample extraction module provided on the chip body;
wherein the sample extraction module comprises a sample-loading lysis unit, a liquid release-control unit, an extraction unit, a liquid switch-control unit, a liquid collection unit and a sample collection unit, which are connected through flow channels in a sequence of extraction;

the liquid release-control unit is configured to store and release liquid reagents, and the liquid switch-control unit is configured to switch between communication of the liquid collection unit and the extraction unit as well as communication of the sample collection unit and the extraction unit; and the sample collection unit comprises a front collection portion and a rear collection portion which are both in communication with the liquid switch-control unit, the front collection portion and the rear collection portion are sequentially distributed along a rotation direction of the chip body, samples flow into the front collection portion first, and then into the rear collection portion, and at least one of the rear collection portion is provided with a sampling port.

2. The sample extraction chip according to claim 1, wherein the front collection portion and the rear collection portion are both collection portions, and the collection portions are evenly spaced along the rotation direction of the chip body.

3. The sample extraction chip according to claim 1, wherein the front collection portion is provided with the sampling port.

4. The sample extraction chip according to claim 1, wherein a volume of each of the front collection portion is greater than a volume of each of the rear collection portion, or the last rear collection portion of the front collection portion and the rear collection portion has a largest volume; and a volume of the sample collection unit is a sum of the volumes of the front collection portion and the rear collection portion, and the volume of the front collection portion accounts for 20% to 30% of the volume of the sample collection unit.

5. The sample extraction chip according to claim 1, wherein the sampling port is sealed by a sealing member, and the sealing member is a suction sac.

6. The sample extraction chip according to claim 1, wherein
the sample-loading lysis unit comprises a lysis device, and a sample inlet provided on the lysis device,
wherein the sample inlet is in communication with the lysis device, and the lysis device and the chip body are two independent parts.

7. The sample extraction chip according to claim 6, wherein
the lysis device comprises:
a lysis shell with ports at two ends,
a sealing film that is connected with the lysis shell and configured to seal one port, and
a sealing cover that is connected with the lysis shell and configured to seal the other port,
wherein the sealing cover is provided with an opening in communication with the sample inlet.

8. The sample extraction chip according to claim 1, wherein the liquid release-control unit comprises
a liquid storage sac, and
a fixed-position release chamber tightly connected with the liquid storage sac,
wherein the liquid storage sac has a liquid storage cover that is deformable under pressure and a sealing layer that is configured to seal the liquid storage cover, a space defined by the sealing layer and the liquid storage cover is configured to contain liquid, and a connection strength of a sealing region between the sealing layer and the liquid storage cover is greater than a strength for rupture of the sealing layer; and the fixed-position release chamber has a guiding chamber for collecting liquid and a liquid release site, and when an external force is applied to the liquid storage cover, and the liquid release site only pierces the sealing layer to cause the liquid storage sac to communicate with the guiding chamber.

9. The sample extraction chip according to claim 8, wherein the guiding chamber is a guiding groove recessed downwardly and provided on the chip body, the guiding groove is in communication with a downstream microchannel, and an inlet of the guiding groove is completely covered by the sealing layer.

10. The sample extraction chip according to claim 9, wherein the liquid release site extends from a wall of the guiding groove to a cavity of the guiding groove, and an end of the liquid release site corresponds to part of the sealing region of the sealing layer; and an edge of the wall of the guiding groove where the liquid release site is not provided has a rounded structure.

11. The sample extraction chip according to claim 1, wherein the liquid release-control unit comprises:
a sliding chamber provided on the chip body,
a liquid storage chamber provided inside the sliding chamber, and
a thorn provided on the chip body and corresponding to a sealing film,
wherein the chip body is provided with a liquid discharge port, and the liquid discharge port is in communication with the downstream microchannel;
the liquid storage chamber tightly cooperates with the sliding chamber and is movable toward the chip body, the sealing film is provided at one end of the liquid storage chamber close to the chip body, and a storage cavity for storing liquid is defined by the sealing film and an inner wall of the liquid storage chamber; and
when the liquid storage chamber is forced to move to contact with the thorn, the sealing film ruptures.

12. The sample extraction chip according to claim 1, wherein the liquid release-control unit comprises a liquid storage chamber and a liquid flow-control unit located downstream from the liquid storage chamber,
wherein the liquid flow-control unit is located between the sample-loading lysis unit and the extraction unit.

13. The sample extraction chip according to claim 12, wherein
the liquid flow-control unit is a capillary channel, an inlet of the capillary channel is closer to a rotation center of the chip body than an outlet of the capillary channel, and a maximum distance from the capillary channel to a surface of the chip body is greater than a distance from an inner wall of the sample-loading lysis unit to the surface of the chip body.

14. The sample extraction chip according to claim 13, wherein
a passive blocking pipe section is provided between the inlet of the capillary channel and an apex of the capillary channel, an equivalent diameter of the passive blocking pipe section is greater than an equivalent diameter of the capillary channel, and a surface of the inner wall or part of the inner wall of the passive blocking pipe section is hydrophobic;

wherein the apex of the capillary channel is a position where a distance from the capillary channel to the surface of the chip body is the largest.

15. The sample extraction chip according to claim 12, wherein
the liquid flow-control unit comprises a flow control pipeline and a blocked pipeline connected in series with the flow control pipeline,
wherein the equivalent diameter of the flow control pipeline is smaller than the equivalent diameter of the blocked pipeline, the blocked pipeline is pre-buried with a hot melt component, and the blocked pipeline is blocked by the hot melt component.

16. The sample extraction chip according to claim 15, wherein
the blocked pipeline is located at a position close to an outlet of the flow control pipeline, a distance from the blocked pipeline to the outlet of the flow control pipeline is not greater than a length of the blocked pipeline, and a pipeline of the flow control pipeline located between the blocked pipeline and the outlet of the flow control pipeline is consistent with a radial direction of the chip body.

17. The sample extraction chip according to claim 12, wherein
the liquid flow-control unit comprises a flow control pipeline and a flow resistance element connected in series with the flow control pipeline,
wherein, when hydraulic pressure in the flow control pipeline is not greater than preset pressure, the flow resistance element is configured to prevent the liquid from passing through the flow control pipeline; and when the hydraulic pressure in the flow control pipeline is greater than the preset pressure, the flow resistance element allows the liquid to pass through the flow control pipeline.

18. The sample extraction chip according to claim 1, wherein
the extraction unit comprises a fluid chamber and an extraction adsorption component located in the fluid chamber,
wherein, one fluid chamber is provided, or two fluid chambers are provided, namely an upstream fluid chamber and a downstream fluid chamber, the upstream fluid chamber and the downstream fluid chamber are connected in series, and the extraction adsorption component is filled in the downstream fluid chamber.

19. The sample extraction chip according to claim 18, wherein whole or a rear end of the fluid chamber filled with the extraction adsorption component or is tapered along a flow direction of the fluid.

20. The sample extraction chip according to claim 1, wherein
the liquid switch-control unit comprises a valve seat, a valve core, an upstream fluid channel connecting pipe, two downstream fluid channel connecting pipes, and a drive component,
wherein the valve seat comprises a valve core movement channel, a first valve core stop position and a second valve core stop position both of which are in the valve core movement channel;
the upstream fluid channel connecting pipe and the downstream fluid channel connecting pipes are all in communication with the valve core movement channel; and
the driving component is configured to drive the valve core to move by magnetic force, and when the valve core is at the first valve core stop position, the upstream fluid channel connecting pipe is in communication with one of the downstream fluid channel connecting pipes; and when the valve core is at the second valve core stop position, the upstream fluid channel connecting pipe is in communication with the other one of the downstream fluid channel connecting pipes.

21. The sample extraction chip according to claim 20, wherein the valve seat is an arc-shaped pipe, and the arc-shaped pipe protrudes toward the rotation center of the chip body, the upstream fluid channel connecting pipe is located in middle of the arc-shaped pipe, and the two downstream fluid channel connecting pipes are respectively located at two ends of the arc-shaped pipe.

22. The sample extraction chip according to claim 1, wherein the liquid switch-control unit comprises a deflection cavity with a set size in a radial direction and a normal direction of the chip body and in a direction perpendicular to the chip body, wherein an upstream liquid inlet is provided on one side of the deflection cavity close to the rotation center of the chip body, two downstream liquid outlets are provided on one side of the deflection cavity away from the rotation center of the chip body, and the two downstream liquid outlets are respectively located at two ends of the deflection cavity.

23. A biological reaction device, comprising the sample extraction chip according to claim 1.

\* \* \* \* \*